United States Patent [19]
Fleischer

[11] 4,150,846
[45] Apr. 24, 1979

[54] CLAMPING DEVICE

[76] Inventor: Henry Fleischer, 18 Notch Park Rd., Little Falls, N.J. 07424

[21] Appl. No.: 819,821

[22] Filed: Jul. 28, 1977

Related U.S. Application Data

[60] Division of Ser. No. 658,582, Feb. 17, 1976, Pat. No. 4,062,573, Division of Ser. No. 479,667, Jun. 17, 1974, abandoned, which is a continuation-in-part of Ser. No. 427,149, Dec. 21, 1973, abandoned.

[51] Int. Cl.² ............................................... F16L 33/22
[52] U.S. Cl. ...................................... 285/87; 285/243; 285/320
[58] Field of Search ............... 285/243, 242, 320, 319, 285/322, 309, 87, 88

[56] References Cited
U.S. PATENT DOCUMENTS

| | | | |
|---|---|---|---|
| 940,678 | 11/1909 | Doane et al. | 285/370 X |
| 978,957 | 12/1910 | Sutton | 285/320 X |
| 1,491,892 | 4/1924 | Weis et al. | 285/243 |
| 2,449,245 | 9/1948 | Nelson | 285/320 |

Primary Examiner—Thomas F. Callaghan

[57] ABSTRACT

There is provided a clamping member for attaching one part of a two part coupling device to a conduit, such as a hose, said clamping member comprising a body section having a bore running therethrough and comprising a first end portion, an intermediate portion and a second end portion, said first end portion being adapted to be connected to one part of the two part hose coupling device. The clamping member further includes at least a pair of spaced apart clamping rods each of which is pivotally connected to the body section of the clamping member, each of said clamping rods including a clamp section connected at one end of said rod, and an annular ring disposed about said body section in contact with said clamping rods, so that when a hose is inserted in the second end portion of the body section, the annular ring member can be positioned so as to bear against the connecting rods and force the connecting rods to be pivoted downwardly so that the clamp section thereof will be forced against the hose and thereby hold the hose in said body section.

7 Claims, 7 Drawing Figures

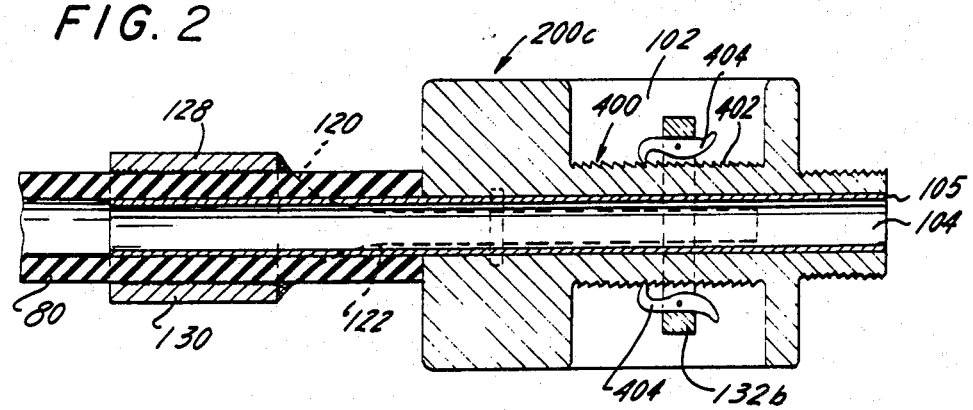
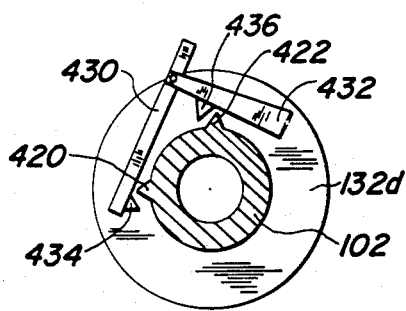
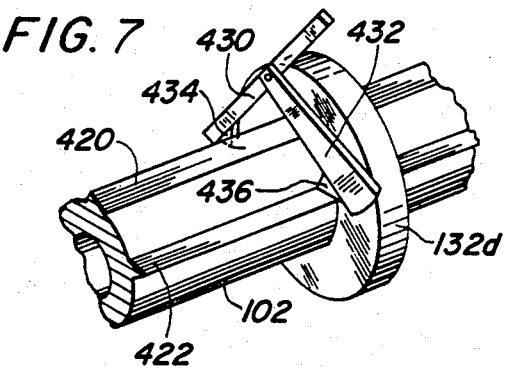
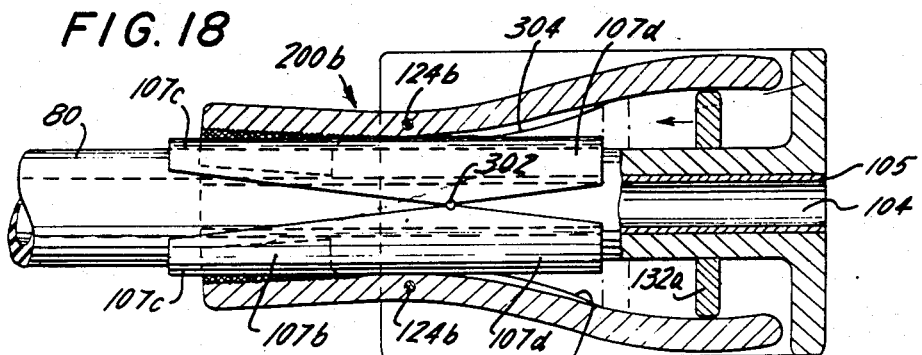
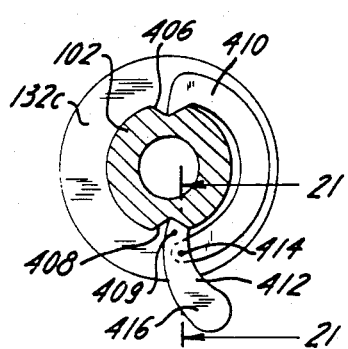
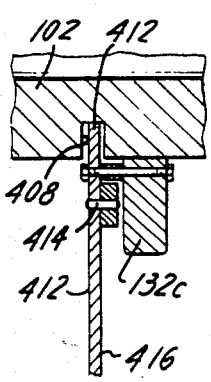
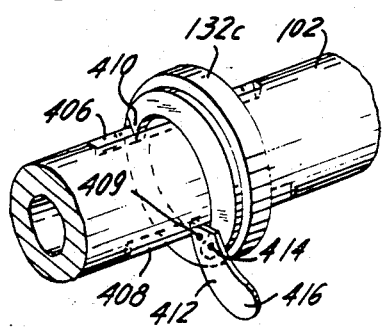

CLAMPING DEVICE

REFERENCE TO OTHER APPLICATIONS

This application is a divisional application of application Ser. No. 658,582 filed Feb. 17, 1976 now U.S. Pat. No. 4,062,573 which is a divisional application of application Ser. No. 479,667, filed June 17, 1974, now abandoned which is a continuation-in-part of application Ser. No. 427,149 filed Dec. 21, 1973, now abandoned.

FIELD OF THE INVENTION

The present invention relates to a clamping member which can be employed to connect one part of a two part coupling device to a hose, such connection and/or subsequent disconnection being effected manually without the need for employing tools.

BRIEF STATEMENT OF THE INVENTION

The present invention provides a clamping member for attaching one part of a two part hose coupling device such as described in application Ser. No. 479,667 filed June 17, 1974, now abandoned and the continuation-in-part thereof (U.S. Pat. No. 4,101,149), such as the socket member or the plug member, to a hose. The clamping member comprises a body section having a bore running therethrough and includes a first end portion, an intermediate portion and a second end portion, the first end portion being adapted to be connected to one part of the two part coupling device, said one part of the coupling device including a tubular end portion having a bore running therethrough, such as a conventional nipple. The clamping member will also include at least a pair of spaced apart clamping rods, each of which is pivotally connected to the body section of the clamping member, each of said clamping rods including a clamp section connected at one end thereof. An annular ring member is disposed about the body portion of the clamping member in contact with the clamping rods, so that when a hose is inserted in the second end portion of the body section, the annular ring member can be positioned so as to force the connecting rods to be pivoted downwardly so that the clamp sections thereof will be forced against the hose and thereby hold the hose in place in the body portion and in communication with the one part of the coupling device. The unique clamping members as described above will allow attachment of the components of the coupling device to conduit sections, such as to two hoses, by hand, without the need for employing wrenches or other tools. Furthermore, the unique clamping members may include a protective cover or sleeve which protects these devices from the impact received upon dropping the same on hard surfaces.

BRIEF DESCRIPTION OF FIGURES

FIG. 2 is a plan view of a further alternative embodiment of the clamping member of the invention, which includes means for holding clamp sections thereof, in place, on a hose;

FIGS. 3 to 5 are various views of alternative means for holding clamp sections of the clamping member of the invention, in place, on a hose;

FIGS. 6 and 7 are views of yet another embodiment of means for holding clamp sections of the clamping member of the invention, in place, on a hose.

DETAILED DESCRIPTION OF PREFERRED EMBODIMENTS

Figure 1:
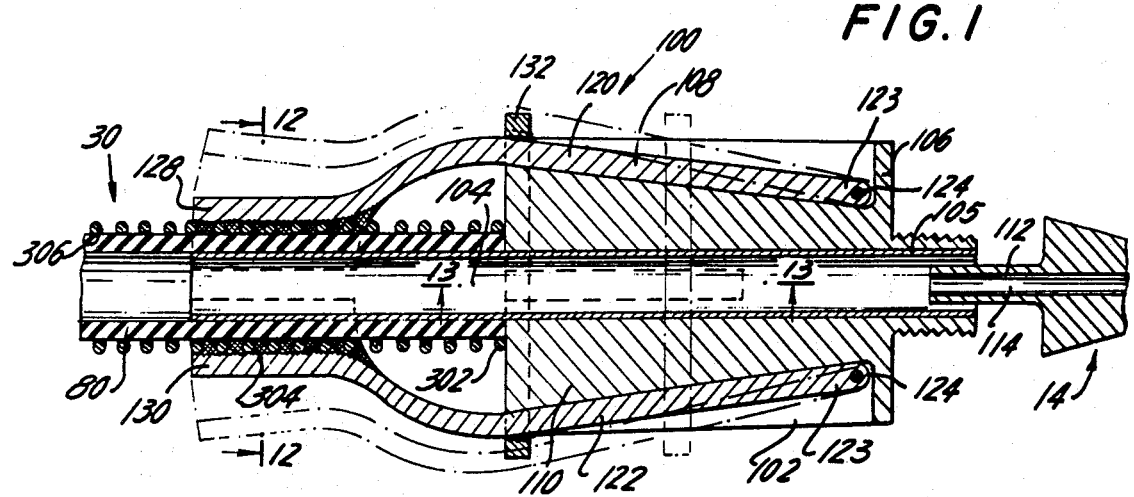
FIG. 1 is a sectional view of a clamping member in accordance with the present invention.

Referring now to the accompanying Figures wherein like parts are represented by like numerals in the several views, in FIG. 1, a clamping member in accordance with the present invention is shown and is identified generally by the numeral 100. The clamping member 100 is employed for attaching one part of a two part coupling device, such as for example, the plug member 14 or the socket member 12, to a hose section 80 as shown in FIG. 1. The clamping member 100 comprises a body section 102 having a bore 104 running therethrough defined by inner walls of the body section 102. The body section 102 comprises a first end portion 106, an intermediate portion 108 and a second end portion 110. The first end portion 106 is adapted to be connected to the one part of the two part coupling device, such as the second end portion of the plug member 14. Disposed within the bore 104 is sleeve 105 which aids in securing a hose to the clamping member as will be described hereinafter.

The second end portion of the plug member 14 will include a nipple or tubular extension 112 which is adapted to be seated in and extend into the bore 104 and sleeve 105 of the body section 102. It will be appreciated that the nipple 112 of the plug member 14 will have a bore 114 which communicates with the bore 104 of the body section when the nipple 112 of the plug member 14 is seated in the body section 102.

The clamping member will include at least a pair of spaced apart clamping rods 120, 122 each of said rods being pivotally connected at one end portion (123) thereof to the body section of the clamping member by means of pivot pins 124 as shown. The other end of the clamping rods 120, 122 will include clamp sections 128, 130, respectively, which are adapted to be pressed against the surface of the hose section 80. The clamp sections 128, 130 will preferably include gripping surfaces, such as ribbed inner surfaces to aid in gripping of the hose section.

The clamping member will also include an annular ring member 132 disposed about the body portion 102 in contact with the clamping rods 120, 122 as shown. When a hose section is inserted in the second end portion 110 of the body section about the sleeve 105, so that the hose is seated between the sleeve 105 and the body portion of the clamping member, the annular ring member can be positioned so as to force the connecting rods 120, 122 to be pivoted downwardly so that the clamp sections 128, 120, respectively, thereof, will be forced against the hose, thereby forcing the hose against the sleeve 105, and holding the hose in place in the body portion 102, and in communication with the plug member, as shown in FIG. 1.

The clamping rods 120 and 122 will preferably be positioned on the body portion 102 of the clamping member 100 so that the clamp sections 128, 130 are disposed oppositely with respect to each other and are in contact with opposite surfaces of the hose section 80, when the clamp sections are in their closed position, as shown in FIG. 1. It is preferred that the clamp sections 128, 130 are formed with a slight curvature or arc so that they can be positioned about substantially any diametered hose in a manner such that the clamp sections will not ordinarily contact each other when in their closed position.

As shown in FIG. 1, the clamping member of the invention may also include a coiled reinforcing spring member 300 one end 302 of which is adapted to be connected to the body section 102 of the clamping member and the intermediate portion 304 and end portion 306 are adapted to encircle a hose section 80 when the hose section is held in place in the body section 102 by the clamping rods 120, 122 and clamp sections 128, 130, respectively. The reinforcing spring member will prevent snapping of the hose section 80 near the portions of the hose which extend from the body section 102 of the clamping member. Such portions of the hose section 80 are subject to constant bending and strain. The spring member 300 will aid in absorbing such forces on the hose section.

It will be appreciated that the ring retaining means of the invention shown in the Figures described hereinafter may be employed in conjunction with the ring member 132 of the clamping member shown in FIG. 1. In FIG. 2, a plan view of the clamping member 200c of the invention is shown and includes connecting rods 120, 122 shown in dotted lines and clamp sections 128, 130, respectively, as well as the inner sleeve 105 as described previously. The annular ring member is referred to by the numeral 132b and is adapted to ride along the track 400 in the body 102 of the clamping member 200c. The track is defined by gear teeth 402, as shown. Pivotally connected to the ring 132b are a pair of latch members 404 which includes a hooked-end portion which is adapted to engage the teeth 402. Thus, when it is desired to move the ring 132b in order to move the clamping rods and clamp sections, the latch members 404 are simply pivoted away from the teeth 402, thereby allowing the ring to be moved up and down the teeth or track. When the clamp sections are set so as to grasp a hose section 80, the latch members 404 are then pivoted so that the hooked end portions thereof engage the teeth 402.

In another embodiment of the ring retaining means as shown in FIGS. 3 to 5, the annular ring member is referred to by the numeral 132c and this ring member may be employed in connection with any of the embodiments of the clamping member of the invention. As shown in FIG. 3, the ring member 132c is disposed over a portion of the body 102 of the clamping member, which body portion includes a pair of indented or recessed portions 406 and 408. Connected to the ring member 132c via pin 409 are a pair of engaging members 410 and 412 which are pivotally connected to each other as at pivot point 414. The member 412 includes a gripping portion 416, as shown. Thus, where it is desired to move the ring member 132c along the body portion 102 of the clamping member, the gripping means 416 of the member 412 is merely pivoted towards the member 410, thereby causing disengagement of the members 412 and 410 from the recessed portions 408, 406, respectively. The ring member 132c is then free to move along the body portion 102 of the clamping member. When the clamping rods and clamp sections are in their set positions, the position of the ring member 132c may be fixed by merely pivoting the member 412 away from the member 410 thereby engaging the ends of the members 412 and 410 in the respective recessed portions 408 and 406 of the body portion 102.

A further embodiment of the ring retaining means is disclosed in FIGS. 6 and 7. In these Figures, the body portion 102 of the clamping member includes a series of projections 420, 422. The ring member referred to by the numeral 132d is disposed about the body portion 102 and includes a pair of pivotally attached members 430, 432 each member of which includes engaging means 434, 436, respectively, which engaging means are adapted to engage the projections 424 and 422. Thus, when it is desired to move the ring 132d along the body portion 102 of the clamping member, the members 430 and 432 are merely pivoted away from the body portion 102 thereby causing the engaging means 434 and 436 to disengage from the projections 420, 422 on the body portion 102. When the clamping rods and clamp sections are set about a hose, the ring member 132d may be fixed by merely pivoting the members 430, 432 toward the body portion 102 of the clamping member thereby causing the engaging means 434, 436 to engage the projections 420, 422, respectively, on the body portion 102.

It will be appreciated that the members 430 and 432 may be enclosed in and sandwiched by the ring 132d and thus less susceptible to undesirable dislodging.

What is claimed is:

1. A clamping member for manually attaching one part of a two part hose coupling device to a hose without need for use of a tool, comprising, in combination, a body section having a bore running therethrough, and comprising a first end portion, an intermediate portion and a second end portion, said first end portion being adapted to be connected to one part of a two part hose coupling device; at least a pair of spaced apart clamping rods each pivotally connected to said body section of said clamping member, each of said clamping rods including a clamp section connected at one end of said rod; rod moving means disposed about said body section in contact with said clamping rods, said rod moving means comprising a ring member disposed about said body section of said clamping member; and ring retaining means in communication with said ring member, said retaining means comprising a plurality of engaging means in said body section of said clamping member, and said ring member being disposed over said engaging means, said ring member including latch means pivotally attached thereto, said latch means being adapted to engage said engaging means of said body section to prevent movement of said ring member, so that when a hose is inserted in said second end portion of said body section said rod moving means can be manually positioned so as to force said connecting rods to be pivoted downwardly so that the clamp sections thereof will be forced against said hose and thereby hold said hose in place in said body section and in communication with said one part of said coupling device.

2. The clamping member in accordance with claim 1 wherein said clamping rods are positioned opposite each other on said body section so that said clamp sections are in contact with opposite surfaces of said hose.

3. The clamping member in accordance with claim 1 wherein said clamp sections are spaced from each other when disposed in contact with said hose.

4. The clamping member in accordance with claim 1 further including an inner sleeve member disposed within said bore of said body section of said clamping member, in a manner such that when a hose section is fitted within said clamping member, a portion of said hose is disposed over at least a portion of said inner sleeve member.

5. A clamping member for manually attaching one part of a two part hose coupling device to a hose without need for use of a tool, comprising, in combination, a body section having a bore running therethrough, and comprising a first end portion, an intermediate portion and a second end portion, said first end portion being adapted to be connected to one part of a two part hose coupling device; at least a pair of spaced apart clamping rods each pivotally connected to said body section of said clamping member, each of said clamping rods including a clamp section connected at one end of said rod; rod moving means disposed about said body section in contact with said clamping rods, said rod moving means comprising a ring member disposed about said body section of said clamping member; and ring retaining means in communication with said ring member, said ring retaining means comprising engaging means in said body portion of said clamping member and a pair of engaging members attached to said ring member and pivotally attached to each other, said engaging members being adapted to pivot into and out from engagement with said engaging means of said body portion of said clamping member, and thereby control movement of said ring member so that when a hose is inserted in said second end portion of said body section said rod moving means can be manually positioned so as to force said connecting rods to be pivoted downwardly so that the clamp sections thereof will be forced against said hose and thereby hold said hose in place in said body section and in communication with said one part of said coupling device.

6. The clamping member in accordance with claim 5 wherein said engaging means in said body portion of said clamping member comprise indented or recessed portions, and said engaging members of said ring member include gripping means adapted to engage said indented or recessed portions.

7. The clamping member as defined in claim 5 wherein said engaging means in said body portions of said clamping member comprises one or more projections, and said engaging members of said ring member comprises pivotally attached members adapted to engage said projections.

* * * * *

UNITED STATES PATENT AND TRADEMARK OFFICE
CERTIFICATE OF CORRECTION

PATENT NO. : 4,150,846
DATED : April 24, 1979
INVENTOR(S) : Henry Fleischer

It is certified that error appears in the above-identified patent and that said Letters Patent are hereby corrected as shown below:

Figure 18 should be deleted.

*Signed and Sealed this*

*Thirty-first* Day of *July 1979*

[SEAL]

Attest:

Attesting Officer

LUTRELLE F. PARKER
*Acting Commissioner of Patents and Trademarks*